(12) United States Patent
Jung et al.

(10) Patent No.: US 8,615,274 B2
(45) Date of Patent: Dec. 24, 2013

(54) ELECTRONIC DEVICE AND CONTROLLING METHOD THEREOF

(75) Inventors: Hyemi Jung, Seoul (KR); Yunmi Kwon, Seoul (KR); Suyeon Song, Seoul (KR); Arim Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 13/333,947

(22) Filed: Dec. 21, 2011

(65) Prior Publication Data

US 2012/0165069 A1    Jun. 28, 2012

(30) Foreign Application Priority Data

Dec. 22, 2010    (KR) .................. 10-2010-0132242

(51) Int. Cl.
*H04M 1/00*    (2006.01)

(52) U.S. Cl.
USPC ............... 455/556.1; 455/556.2; 455/557; 455/566; 455/456.3; 340/995.25; 340/436; 340/988

(58) Field of Classification Search
USPC ......... 455/556.1; 382/284; 715/784; 701/431
See application file for complete search history.

(56) References Cited

U.S. PATENT DOCUMENTS

| | | | | |
|---|---|---|---|---|
| 8,180,567 | B2* | 5/2012 | Geelen et al. | 701/431 |
| 2007/0065041 | A1* | 3/2007 | Ming | 382/284 |
| 2010/0199213 | A1* | 8/2010 | Suzuki | 715/784 |

* cited by examiner

*Primary Examiner* — David Q Nguyen (74) *Attorney, Agent, or Firm* — Lee, Hong, Degerman, Kang & Waimey (57) ABSTRACT

The present invention relates to an electronic device and method for controlling the electronic apparatus. According to the present invention, the electronic device combines a map image obtained from an external image that is received through a camera with a map contents to display.

15 Claims, 10 Drawing Sheets

ELECTRONIC DEVICE AND CONTROLLING METHOD THEREOF

CROSS REFERENCE TO RELATED APPLICATIONS

Pursuant to 35 U.S.C. 119(a), this application claims the benefit of earlier filing date and right of priority to Korean Patent Application No. 10-2010-0132242, filed on Dec. 22, 2010, the contents of which are hereby incorporated by reference in their entirety.

BACKGROUND

1. Field of the Invention

The present invention relates to an electronic device and a controlling method thereof.

2. Related Art

Electronic apparatuses may be classified into mobile terminals and stationary terminals. Mobile terminals may be further classified into handheld terminals or vehicle mount terminals based on whether users can personally carry the terminals.

As electronic apparatuses of today are expected to provide various kinds of services, it is highly demanded to improve structure and/or software of the conventional electronic apparatuses.

SUMMARY

An electronic device according to one aspect of the present invention comprises a camera; a display module; and a controller acquiring a first map image having map contents, extracting a second map image from an external image received through the camera, synthesizing the second map image and the first map image to generate a synthesized map image, and displaying the synthesized map image through the display module.

An electronic device according to another aspect of the present invention comprises a camera; and a controller receiving a first external image including a map image through the camera, extracting at least one object from the map image included in the first external image, receiving a second external image through the camera, and displaying the at least one object extracted from the map image on the second external image through the display module, where the controller displays the at least one extracted object on the second external image based on a position of each of the at least one object extracted from the map image, a current position of the electronic device and a viewing direction of the camera.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

The present invention will now be described in more detail with reference to the accompanying drawings, in which exemplary embodiments of the invention are shown. The invention may, however, be embodied in many different forms and should not be construed as being limited to the embodiments set forth herein; rather, those embodiments are provided so that this disclosure will be thorough and complete, and will fully convey the concept of the invention to those skilled in the art.

In the following description, suffixes "module" and "unit" are given to components of the electronic device only for the purpose of describing the invention and do not have particular meanings or functions distinguished from each other.

The electronic device described in this document may include a smart phone, a laptop computer, a digital broadcasting terminal, a personal digital assistant (PDA), a portable multimedia player (PMP), a digital TV, a desktop computer, a set-top box, a digital camera, a navigation system, etc.

Figure 1:
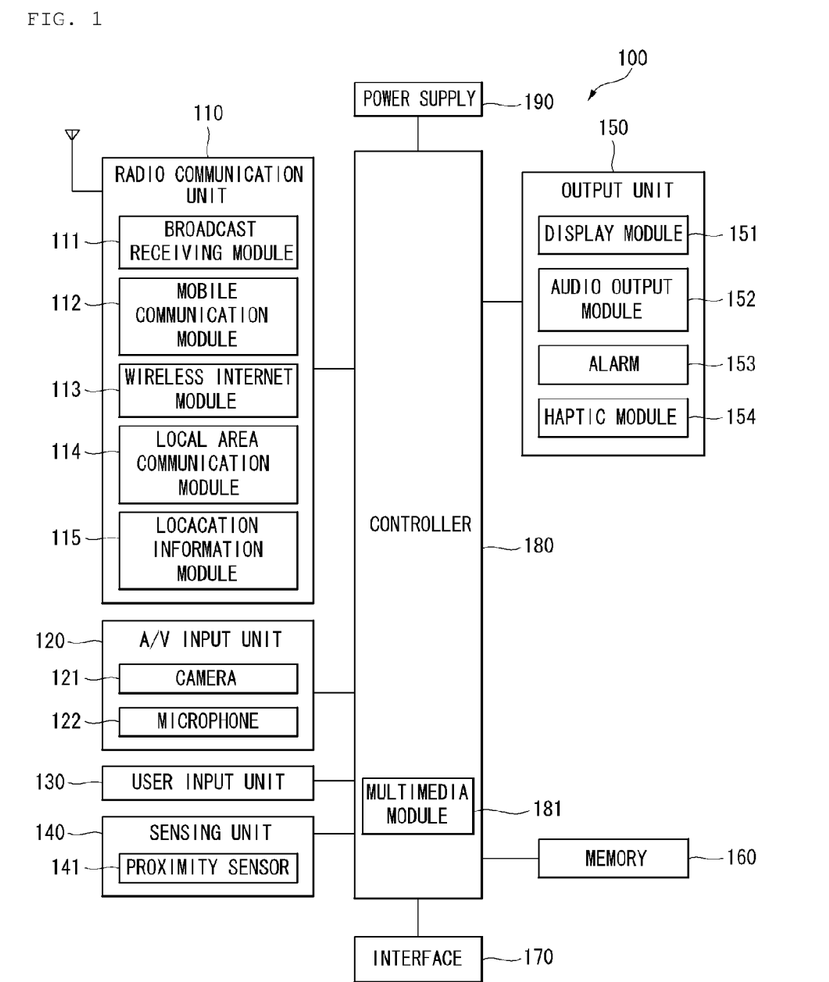
FIG. 1 is a block diagram of a mobile terminal according to an embodiment of the present invention.

FIG. 1 is a block diagram of an electronic device 100 according to an embodiment of the present invention. Other embodiments, configurations and arrangements may also be allowed. As shown in the figure, the electronic device 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the electronic device 100 may be varied. The components of the electronic device 100 will now be described.

The radio communication unit 110 can include at least one module that enables communication between the electronic device 100 and a communication system or between the electronic device 100 and a network to which the electronic device 100 belongs. For example, the radio communication unit 110 can include a broadcasting receiving module 111, a mobile communication module 112, a wireless Internet module 113, a local area communication module 114 and a location information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to the electronic device. The broadcasting signals can include not only TV broadcasting signals, radio broadcasting signals and data broadcasting signals but also signals in the form of a combination of a TV broadcasting signal and a radio broadcasting signal.

The broadcasting related information can be information about a broadcasting channel, a broadcasting program or a broadcasting service provider. The broadcasting related information can be provided even through a mobile communication network. In this case, the broadcasting related information can be received by the mobile communication module 112.

The broadcasting related information can be implemented in various forms. For example, the broadcasting related information can be implemented in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suitable for other broadcasting systems providing broadcasting signals as well as the digital broadcasting systems described above.

The broadcasting signals and/or broadcasting related information received through the broadcasting receiving module 111 can be stored in the memory 160.

The mobile communication module 112 transmits and receives a radio signal to and from at least one of a base station, an external apparatus and a server on a mobile communication network. The radio signal can include a voice call signal, a video telephony call signal or data in various forms depending on transmission and reception of text/multimedia messages.

The wireless Internet module 113 means a module for wireless Internet access and can be included in the electronic device 100 or externally attached to the electronic device 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The location information module 115 confirms or obtains the position of the electronic device. A global positioning system (GPS) module is a representative example of the location information module 115. According to the current technology, the GPS module 115 can obtain information about ranges between one point (object) and at least three satellites and information about the time at which the range information is obtained; and apply trilateration to the obtained range information to obtain three-dimensional position information of the point (object) in terms of latitude, longitude, and altitude in a predetermined time. Furthermore, a method of calculating position and time information using three satellites and correcting the calculated position and time information using another satellite is also used. In addition, the GPS module 115 continuously calculates the current position in real time and estimates velocity information based on the position information.

Referring to FIG. 1, the A/V input unit 120 is used to input an audio signal or a video signal and can include a camera 121 and a microphone 122. The camera 121 processes image frames of still images or moving images obtained from an image sensor in a video telephony mode or a photographing mode. The processed image frames can be displayed on a display module 151.

The image frames processed by the camera 121 can be stored in the memory 160 or transmitted to an external apparatus through the radio communication unit 110. The electronic device 100 can include at least two cameras according to the structure of the electronic device 100.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the electronic device 100 from a user. The user input unit 130 can include a keypad, a dome switch, a touch pad (constant voltage/capacitance), a jog wheel, a jog switch, and so on.

The sensing unit 140 senses a current state of the electronic device 100, including open/close state of the electronic device 100, the position of the electronic device 100, a state about whether the user touches the electronic device 100, the direction of the electronic device 100 and acceleration/deceleration of the electronic device 100; and generates a sensing signal for controlling the operation of the electronic device 100. For example, if the electronic device 100 corresponds to a slide phone, the sensing unit 140 can sense whether the slide phone is opened or closed. Furthermore, the sensing unit 140 can sense whether the power supply 190 supplies power and whether the interface 170 is connected to an external apparatus. The sensing unit 140 can include a proximity sensor.

The output unit 150 generates visual, auditory or tactile output and can include the display module 151, an audio output module 152, an alarm 153 and a haptic module 154.

The display module 151 displays information processed by the electronic device 100. For example, the display module 151 displays UI or graphic user interface (GUI) related to a telephone call when the electronic device is in the call mode. The display module 151 displays a captured and/or received image, UI or GUI when the electronic device 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the electronic device 100 through an area of the body of the electronic device 100, which is occupied by the display module 151.

The electronic device 100 can include at least two display modules 151 according to the structure of the electronic device 100. For example, the electronic device 100 can include a plurality of displays that are arranged on a single surface with a predetermined interval between adjacent displays or being integrated together. Otherwise, the plurality of displays can be distributed on different sides.

In the case where the display module 151 and a sensor detecting a touch (referred to as a touch sensor hereinafter) form a layered structure, which is referred to as a touch screen hereinafter, the display module 151 can be used as an input apparatus as well as an output apparatus. The touch sensor can be in the form of a touch film, a touch sheet, or a touch pad, for example.

The touch sensor can be constructed such that it converts a change of pressure applied to a specific portion of the display module 151 or a change in capacitance generated at a specific portion of the display module 151 into an input electrical signal. The touch sensor can be constructed such that it can sense pressure at the time of a touch as well as the position and area of the touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the electronic device, surrounded by the touch screen, or near the touch screen. The proximity sensor senses an object approaching a predetermined sensing area or an object located near the proximity sensor using electromagnetic force or infrared rays without a physical contact. The proximity sensor has a lifetime longer than that of a contact sensor and has wide application.

A proximity sensor can be implemented in various ways, including a transmission type photo-electric sensor, a direct reflection type photo-electric sensor, a minor reflection type photo-electric sensor, a high-frequency oscillating proximity sensor, a capacitive proximity sensor, a magnetic proximity sensor, an infrared proximity sensor, etc.

A capacitive touch screen is constructed such that presence of a nearby pointer is detected in the form of a change in an electric field according to the proximity of the pointer. In this case, the touch screen (touch sensor) can be classified as a proximity sensor.

For convenience of explanation, in the following description, estimating the position of the pointer on the touch screen as the pointer is moved toward the touch screen before physical contact is referred to as "proximity touch" and an action of bringing the pointer into physical contact with the touch screen is referred to as "contact touch". A proximity touch point of the pointer on the touch screen denotes a point of the touch screen at which extension of the pointer in a perpendicular direction comes into contact with the touch screen when the pointer makes a proximity touch.

The proximity sensor senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode; a telephone call mode or a recording mode; a speech recognition mode; and a broadcasting receiving mode. The audio output module 152 outputs an audio signal related to a function (for example, a call signal reception sound, a message reception sound, etc.) performed in the electronic device 100. The audio output module 152 can include a receiver, a speaker, a buzzer, etc.

The alarm 153 outputs a signal for notifying occurrence of an event in the electronic device 100. Examples of events occurred in the electronic device include call signal reception, message reception, key signal input, touch input, etc. The alarm 153 can output a signal for notifying occurrence of an event with vibration in addition to a video signal or an audio signal. The video signal or the audio signal can also be output through the display module 151 or the audio output module 152.

The haptic module 154 generates various haptic effects that the user can feel. A typical haptic effect is vibration. Intensity and a pattern of vibration generated by the haptic module 154 can be adjusted. For example, different vibrations can be output sequentially, or a synthesized vibration from the individual vibrations can be output.

The haptic module 154 can generate a variety of haptic effects including a stimulation effect due to arrangement of pins vertically moving relative to a skin contact surface, a stimulation effect using an injection force or an inhalation force of air through an injection nozzle or an inhalation nozzle, a stimulation effect due to grazing of a skin surface, a stimulation effect through a contact of an electrode, a stimulation effect using electrostatic force, and a stimulation effect according due to reproduction of cold and warmth using an element that can absorb or emit heat, in addition to vibration.

The haptic module 154 can not only transmit haptic effects through direct contact but also allow the user to feel haptic effects through kinesthetic sense of his fingers or arms. The electronic device 100 can include at least two haptic modules 154 according to configuration of the electronic device.

The memory 160 can store a program for operating the controller 180 and temporarily store input/output data (for example, phone book, messages, still images, moving images, etc.). The memory 160 can store data about various patterns of vibrations and sounds, which are output when a touch input is applied to the touch screen.

The memory 160 can include at least one of a flash memory type, a hard disk type, a multimedia card micro type, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The electronic device 100 can operate in association with web storage on the Internet performing the storing function of the memory 160.

The interface 170 serves as a passage for all external apparatuses connected to the electronic device 100. The interface 170 receives data or power from the external apparatuses and transmits the data or power to the internal components of the electronic device 100 or transmits data of the electronic device 100 to the external apparatuses. The interface 170 can include a wired/wireless headset port, an external charger port, a wired/wireless data port, a memory card port, a port for connecting an apparatus having a user identification module, an audio I/O port, a video I/O port, an earphone port, etc.

An identification module is a chip that stores information for certifying user authority of the electronic device 100 and can include a user identity module (UIM), a subscriber identity module (SIM), and a universal subscriber identity module (USIM). An apparatus (hereinafter, it is referred to as an identification apparatus) including the identification module can be manufactured in the form of a smart card. Accordingly, the identification apparatus can be connected to the electronic device 100 through a port.

The interface 170 can serve as a passage through which power from an external cradle is provided to the electronic device 100 when the electronic device 100 is connected to the external cradle or a passage through which various command signals are received from the user through the cradle to the electronic device 100. Various command signals or power input from the cradle can be used for confirming whether the electronic device 100 has been correctly inserted into the cradle.

The controller 180 controls the overall operation of the electronic apparatus. For example, the controller 180 performs control and processing for voice communication, data communication, and video telephony. The controller 180 can include a multimedia module 181 for playing multimedia contents. The multimedia module 181 can be included in the controller 180 or separated from the controller 180.

The controller 180 can perform a pattern recognition process capable of recognizing a cursive input or drawing input performed on the touch screen as a character or an image.

The power supply 190 receives external power and internal power and provides power required for the operations of the components of the electronic device under the control of the controller 180.

Various embodiments of the present invention can be implemented in a computer-readable recording medium (or a recording medium readable by a similar apparatus) using software, hardware or a combination of the both, for example.

According to hardware implementation, the embodiments of the present invention can be implemented using at least one of application specific integrated circuits (ASICs), digital signal processors (DSPs), digital signal processing apparatus s (DSPDs), programmable logic apparatus s (PLDs), field programmable gate arrays (FPGAs), processors, controllers, micro-controllers, microprocessors, and electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Hereinafter, embodiments of the present invention will be described.

The embodiments disclosed in this document can be embodied in the electronic device 100 described with reference to FIG. 1.

In the embodiment of the present invention, it is supposed that the display module 151 is a touch screen for the convenience of description. As described above, the touch screen 151 can perform both information display function and information input function. However, it should be noted that the present invention is not limited to this configuration. Further, the touch mentioned herein may include both a physical touch and a proximity touch.

Hereinafter, a touch gesture denotes a gesture made by physically touching the touch screen 151 or by proximity sensing of the touch screen 151, and a touch input denotes an input received by the touch gesture. A touch gesture is classified into tapping, dragging, flicking, and pressing depending on the touch operation.

Tapping may be defined as a motion of gently pressing the touch screen 151 once and releasing, which resembles a mouse click in a computer.

Dragging may be described as a motion of releasing after moving toward a specified position while the touch screen 151 is kept in touch; when an object is dragged, the object is displayed showing continuous movement along the dragging direction.

Flicking is a motion of releasing the touch screen 151 after touching the touch screen 151 and moving toward a specific direction (up, down, left, right or diagonally). When the electronic device 100 receives a touch input in the form of flicking, it processes specific operation based on a flicking direction, a speed, and so on. For example, it is possible to perform an operation of turning the pages of an e-book based on a flicking direction.

Finally, pressing implies a motion of touching the touch screen 151 and keeping the touch state over a predetermined time.

Hereinafter, a method for controlling the electronic device 100 according to a first embodiment of the present invention and operation of the electronic device 100 will be described in detail with reference to related drawings.

Figure 2:
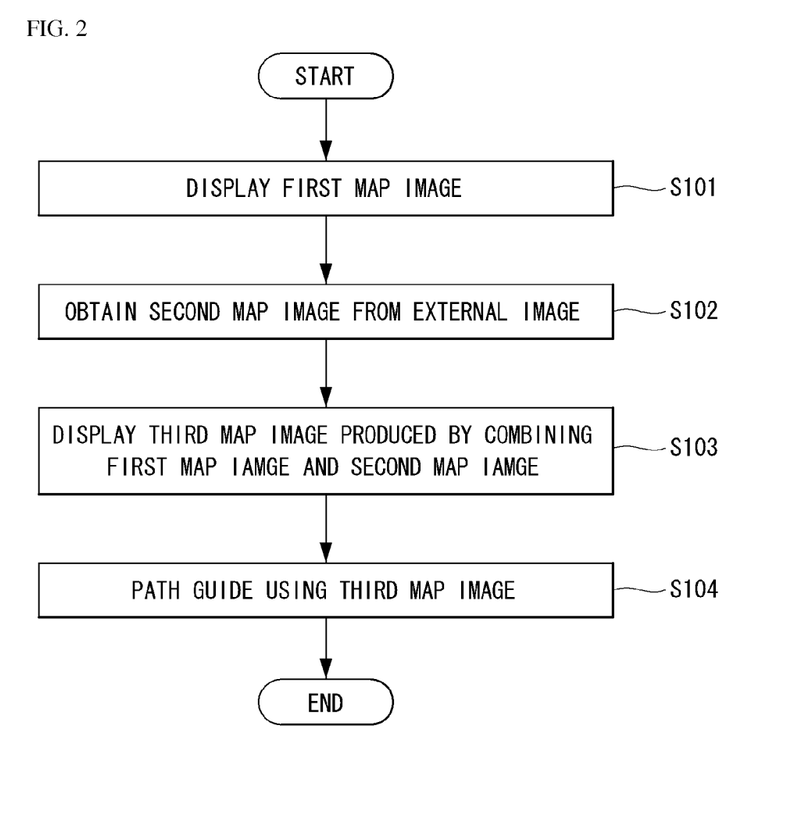
FIG. 2 is a flow chart illustrating a method for controlling an electronic device 100 according to a first embodiment of the present invention.

FIG. 2 is a flow chart illustrating a method for controlling an electronic device 100 according to a first embodiment of the present invention. FIGS. 3 to 8 show one example in which two map images are displayed being overlapped with each other in an electronic device 100 according to a first embodiment of the present invention.

Referring to FIG. 2, the controller 180 may obtain a current position of the electronic device 100 through a location information module 115, and may then display a first map image corresponding to the current position through a display module 115 (S101). The first map image can be displayed using the map contents stored previously in a memory or received through a radio communication unit 110.

Further, the controller 180 may obtain an external image including a real map through a camera 121, and may then obtain a second map image corresponding to the real map from the obtained external image (S102). The real map is different from the map contents stored previously in the memory 160 or received through the radio communication unit 110, which is displayed outside the electronic device and can be captured through a camera of the electronic device 100.

For example, the real map may be a map that is displayed on a traffic sign in the form of a picture found in a subway train, on the roadside, and so on.

When the controller 180 obtains a second map image through the camera 121, the controller 180 may map the second map image onto the first map image, and may then display a third map image generated by combining the two images based on the mapping result (S103).

Since then, if a destination is selected by the user while the third map image is displayed, the controller 180 may calculate a path to the destination (S104).

In step S102, if the second map image is obtained while the first map image is displayed, the controller 180 may display the two map images being overlapped with each other. If the two map images are displayed being overlapped with each other, the controller 180 may control color, saturation, and brightness in order to make objects in the two map images distinguished from one another.

For example, the controller 180 controls transparency of one of the two map images to be semi-transparent so that the two map images can be distinguished from each other even if the two map images overlap with each other.

Figure 3:
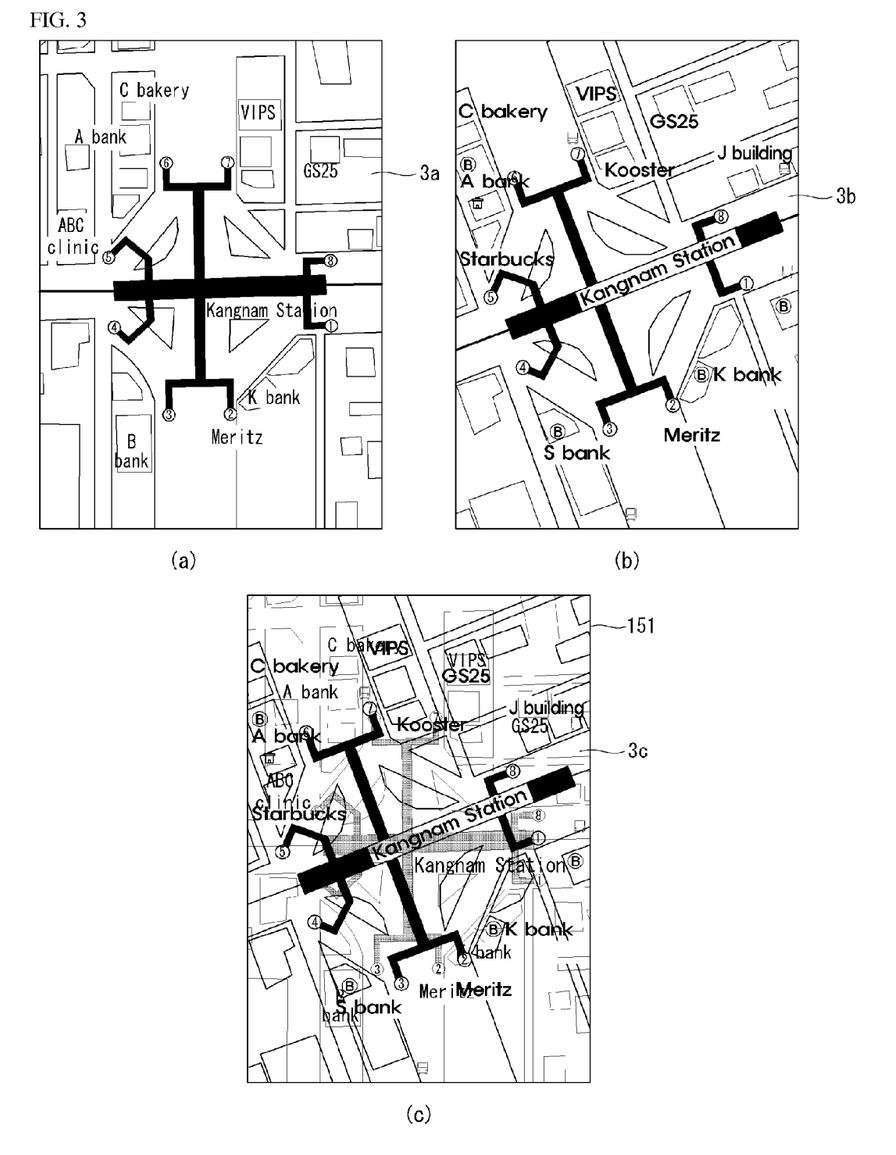
FIG. 3 shows one example in which two map images are displayed being overlapped with each other in an electronic device 100 according to a first embodiment of the present invention.

FIG. 3 shows one example in which two map images are displayed being overlapped with each other.

FIG. 3(*a*) is a first map image (3*a*) corresponding to map contents and FIG. 3(*b*) is a second map image (3*b*) obtained from an external image. FIG. 3(*c*) is an image (3*c*) produced by merging the two map images.

Referring to FIG. 3, the controller 180 controls transparency of the first map image (3*c*) to be semi-transparent, so that the user can view the first and second map images (3*a* and 3*b*) at the same time.

Although transparency of the first map image (3*a*) is controlled to be semi-transparent in the example of FIG. 3, the present invention is not limited to this case. That is, in the present invention, transparency of the second map image (3*b*) obtained from the external image can be controlled to be semi-transparent and displayed being overlapped with the first map image (3*a*).

Referring back to FIG. 2, in step S103, the controller 180 may display a direction indicator to indicate a moving direction of the second map image based on a mapping result of the first and second map images. That is, the controller 180 may display a direction indicator to indicate a moving direction of the camera in order to move an area of a real map received through the camera 121.

For example, the controller 180 obtains a common area that is included in both the two map images through matching objects included in both the first and second map image. And then, if the common area does not reach a predetermined level, the controller 180 may display a direction indicator indicating a moving direction of the camera 121.

Further, for example, if more map information in a specific direction is needed in the second map image, the controller 180 may display a direction indicator indicating a movement of the camera 121 in the direction.

Further, for example, if current positions of the user that is obtained respectively from the first and second map image do not coincide with each other, the controller 180 may display a direction indicator indicating a movement of the camera 121 in the direction. The controller 180 may obtain the current position of the user on the second map image through image recognition of the second map image. Further, the controller 180 may obtain the current position of the user on the first map image based position information obtained from the location information module 115.

Meanwhile, the controller 180 may obtain the moving direction of the camera 121 based on relative positions among objects mapped onto the two map images. That is, the controller 180 obtains specific object included both in the first and the second map image. And then, the controller 180 may obtain the moving direction of the camera 121 by comparing positions of a specific object on the first map image and the second map image. In this case, the specific object used as a reference to obtain the moving direction of the camera 121 may be selected by a user. If the specific object displayed on the first map image is selected by the user, the controller 180 may search for an object on the second map image coincided with the selected object. And then, the controller 180 may obtain the moving direction of the camera 121 by comparing a relative position difference between the two objects.

Also, the controller 180 may obtain the moving direction of the camera 121 based on a relative position between two positions mapped onto the two map images. That is, the controller 180 may obtain the moving direction of the camera 121 based on a relative position between the two points indicating the same position in the first and the second map image, e.g., a current position of the user. In this case, the positions used as a reference for calculating the moving direction of the camera 121 may be selected by the user. If a specific point on the first map image is selected by the user, the controller 180 may search the second map image for a point corresponding to the selected point, and may then obtain the moving direction of the camera 121 based on a relative position difference due to the mapping onto the two map images.

Figure 4:
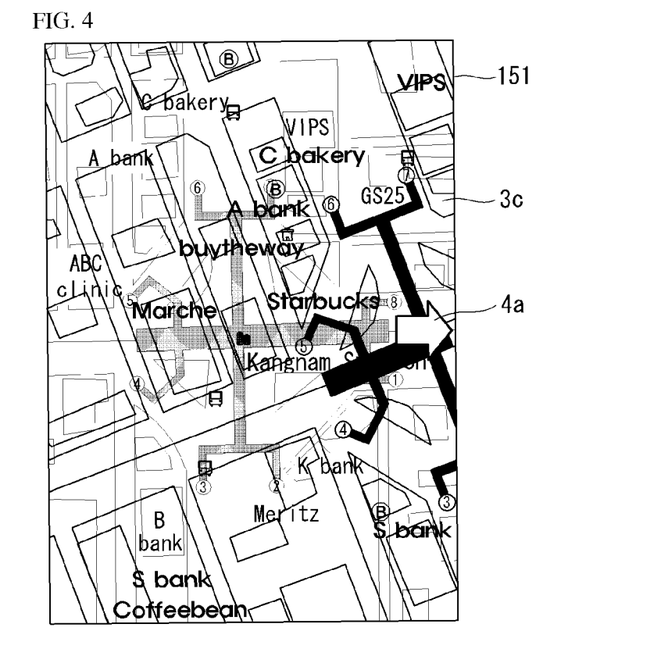
FIG. 4 shows one example of a direction indicator in an electronic device according to a first embodiment of the present invention.

FIG. 4 shows one example of a direction indicator.

Referring to FIG. 4, it can be noticed that there is a large mismatch between areas in the first and the second map image. For example, while a crossroad in a subway station is positioned at the center point in the first map image, the crossroad in the subway station is positioned being shifted to the right in the second map image.

Accordingly, the controller 180 obtains a moving direction of the camera 121 that is used to make centers of the first and the second map image to coincide with each other based on a mapping result of the two map images. That is, the controller 180 obtains the moving direction of the camera 121 for moving the crossroad in the subway station toward the center of the second map image as in the first map image, and then displays a direction indicator 4*a* corresponding to the obtained moving direction. Accordingly, the user is guided to move the camera 121 in order to obtain a map image corresponding to the first map image from the real map.

Referring back to FIG. 2, in step S103, the controller 180 may map the second map image onto the first map image with reference to a point selected in the first and the second map image.

If a specific point is selected in the first and the second map image, the controller 180 may gradually perform mapping, starting with an object positioned at the selected point.

For example, if a first point of the first map image is selected as a reference point, the controller 180 obtains a first object positioned at the first point on the first map image, and then searches the second map image for the object corresponding to the obtained first object. If the first object mapped onto the second map image is found, the controller 180 extracts a second object adjacent to the first object in the first map image, and then searches for an object corresponding to the second object in the second map image. In this way, the controller 180 may perform mapping of the two map images while gradually moving starting from the selected point.

Meanwhile, when the controller 180 searches the second map image for an object corresponding to the first object of the first map image, the controller 180 may obtain a search area within a predetermined distance from the object corresponding to the first object in the second map image. And then, the controller 180 may search the search area for an object corresponding to the second object of the first map image. It is because there is a high possibility that objects corresponding to the first and the second object are positioned close to each other in the second map image, since the first and the second object are positioned close to each other in the first map image.

As described above, when selecting a reference point to be used as a mapping reference for the two map images, the controller 180 may limit a search region to a partial area rather than the whole area, thereby reducing computational load during a mapping procedure significantly. Accordingly, it is possible to improve a mapping speed considerably compared when mapping is performed without a reference point. Also, it is possible to remarkably reduce mapping error compared with a case when mapping is performed without a reference point.

Meanwhile, the controller 180 may use a current position of the electronic device 100 as a reference point to map two map images. The current position of the electronic device 100 may be obtained through the location information module 115. Also, the current position of the electronic device 100 may be obtained based on a touched point in the display area of the electronic device 100. For example, the user may make particular points in the two map images coincide with each other and touch the point to select as a current position.

In step S103, the controller 180 may control the two map images so that orientations and scales of the two map images are matched based on a mapping result of the first and second map images.

For example, the controller 180 may control the two map images such that the orientations of the two map images are matched to each other by moving one of the two map image to a specific direction or rotating it in a specific direction based on a relative position between matched objects among objects included in the first and the second map image.

Also, for example, the controller 180 may control the two map images such that scales of the two map images are matched to each other by enlarging/reducing one of the two map images based on a relative size of matched objects among objects included in the first and the second map image.

Figure 5:
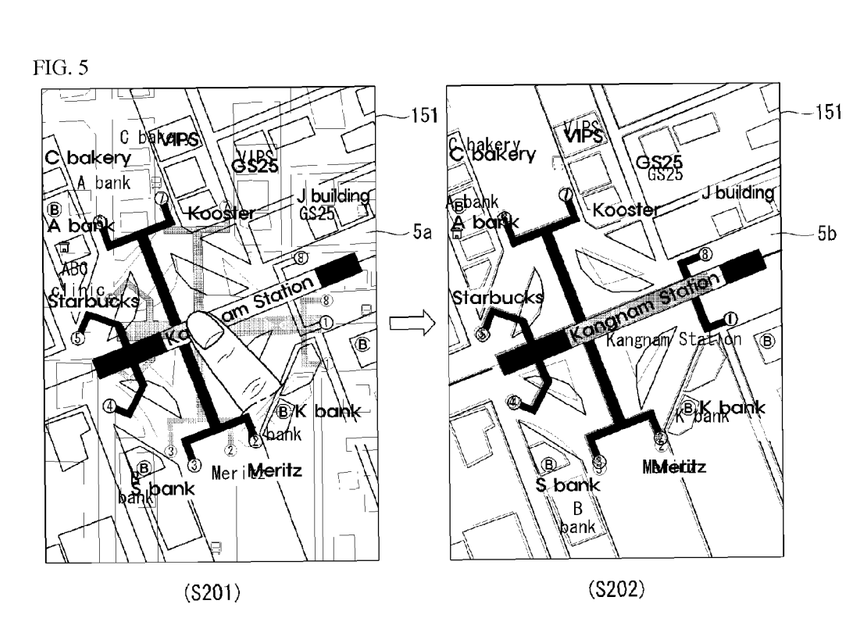
FIG. 5 shows one example in which orientations and scales of two map images are matched to each other in an electronic device according to a first embodiment of the present invention.

FIG. 5 shows one example in which orientations and scales of two map images are matched to each other.

Referring to FIG. 5, the controller 180 displays an image 5*a* produced by overlapping the first and the second map image through the display module 151.

And then, if any one point in the display area is touched, the controller 180 performs a mapping procedure with reference to the point touched (S201). That is, the mapping is performed gradually starting from an object positioned in the touched point to nearby objects.

The controller 180 changes orientation and scale of one of the two map images in order for the two map images to be matched to a predetermined level or more based on a mapping result, and then displays a third map image 5*b* by merging the map images whose orientations and scales have been changed (S202).

Referring back to FIG. 2, in step S103, the controller 180 may display two map images by combining them in various ways.

Hereinafter, examples for combining two map images will be described.

The controller 180 may combine two map images by overlapping a first and the second map image. To this purpose, the controller 180 changes orientation and scale of one of the first and the second map image with reference to the other map image, and then controls transparency of either of the two map images to be semi-transparent.

Figure 6:
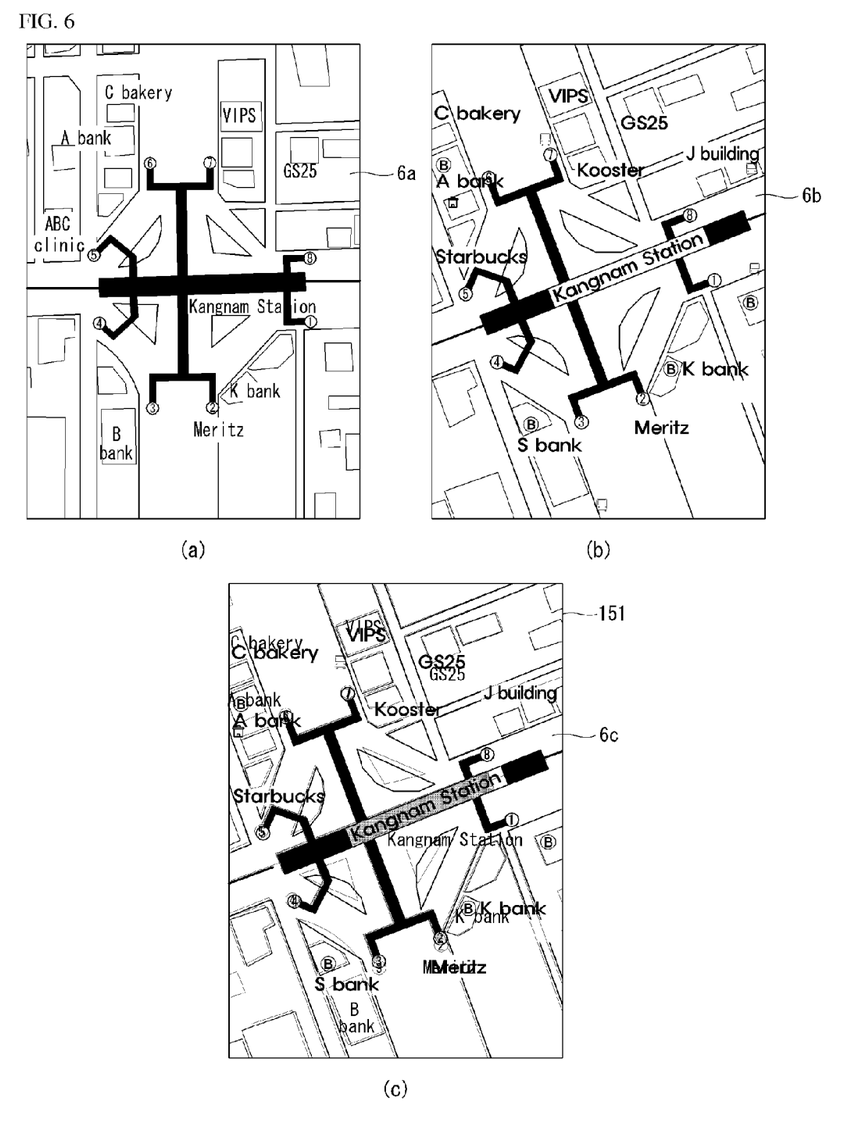
FIG. 6 shows one example in which two map images are merged into a single image in an electronic device 100 according to a first embodiment of the present invention.

FIG. 6 shows one example in which two map images are merged into a single image by overlapping the two map images for display.

FIG. 6(*a*) is a first map image 6*a* showing map contents; FIG. 6(*b*) is a second map image 6*b* obtained from an external image; and FIG. 6(*c*) is a third map image 6*c* produced by combining the two map images.

Referring to FIG. 6, the controller 180 changes orientation and scale of the first map image 6*a* to be matched to the orientation and the scale of the second map image 6*b*, and then generates the third map image 6*c* by combining the first map image 6*c* whose orientation and scale have been changed with the second map image 6*b*.

Also, the controller 180 may combine two map images by incorporating at least one object extracted from the second map image into the first map image. The objects extracted from the second map image may include texts, figures, and icons used to display various kinds of map information.

Meanwhile, if the object extracted from the second map image is a text, the controller 180 may translate the extracted text into a language selected by the user and combine the translated text into the first map image.

For example, if a text extracted from the second map image is found to be different from the language used for the text displayed on the first map image, the controller 180 may translate the text extracted from the second map image into the language used for the first map image, and may then combine the translated text into the first map image.

Also, for example, the controller 180 may translate texts extracted from the second map image according to a specific language selected by the user and combine the translated texts with the first map image for display.

Figure 7:
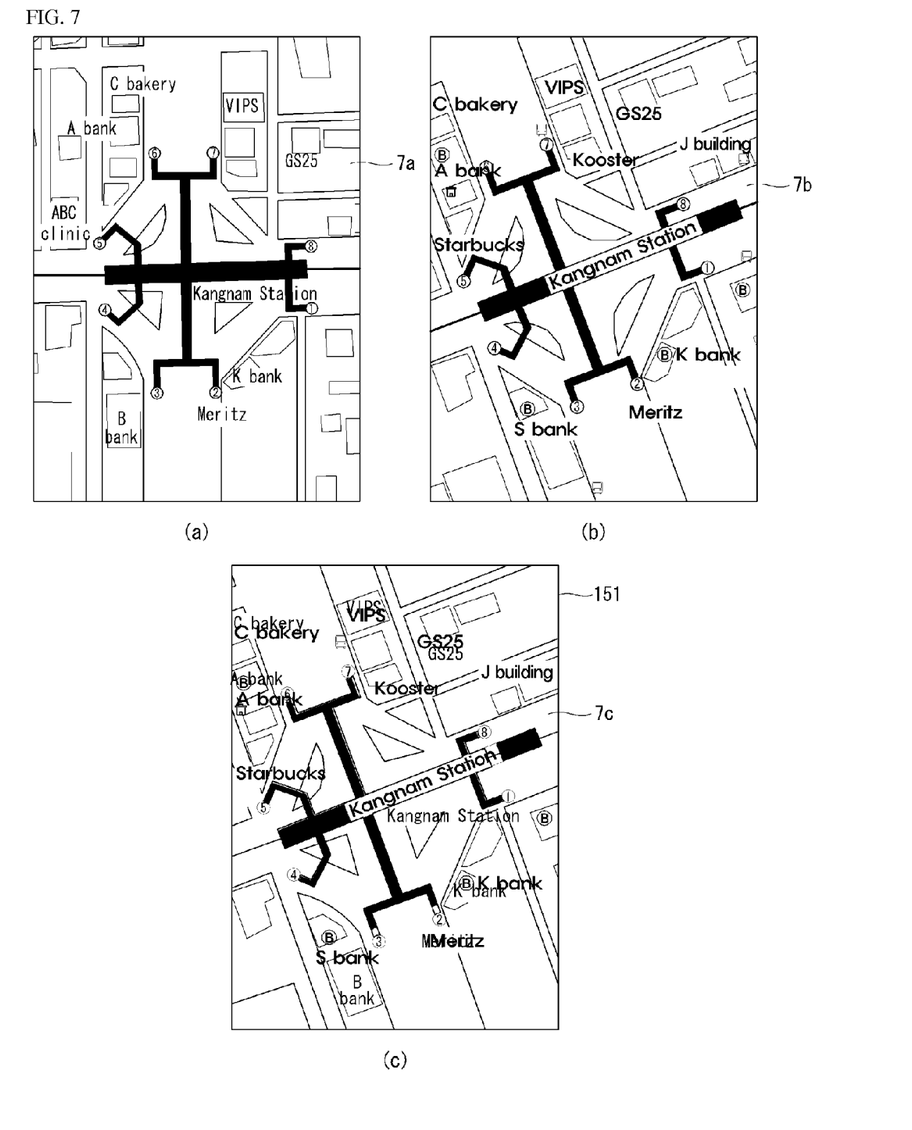
FIG. 7 shows another example in which two map images are merged into a single image in an electronic device 100 according to a first embodiment of the present invention.

FIG. 7 shows another example in which two map images are merged into a single image by combining at least one object extracted from a second map image with a first map image.

FIG. 7(*a*) is a first map image 7*a* showing map contents and FIG. 7(*b*) is a second map image 7*b* obtained from an external image. FIG. 7(*c*) is a third map image 7*c* produced by combining objects extracted from the second map image 7*b* with the first map image 7*a*.

Referring to FIG. 7, the controller 180 extracts at least one object from the second map image 7*b* and combines extracted objects with the first map image 7*a*. For example, the controller 180 extracts a text "Starbucks" from the second map image 7*b* and combines the extracted text "Starbucks" with the first map image 7*a* for display.

FIG. 7 illustrates a case where the third map image 7*c* is generated after orientation and scale of the first map image is changed to match with those of the second map image but the present invention is not limited to the above case. According to the present invention, the controller 180 may utilize the first map image 7*a* to generate the third map image 7*c* without changing orientation and scale of the first map image 7*a*.

Figure 8:
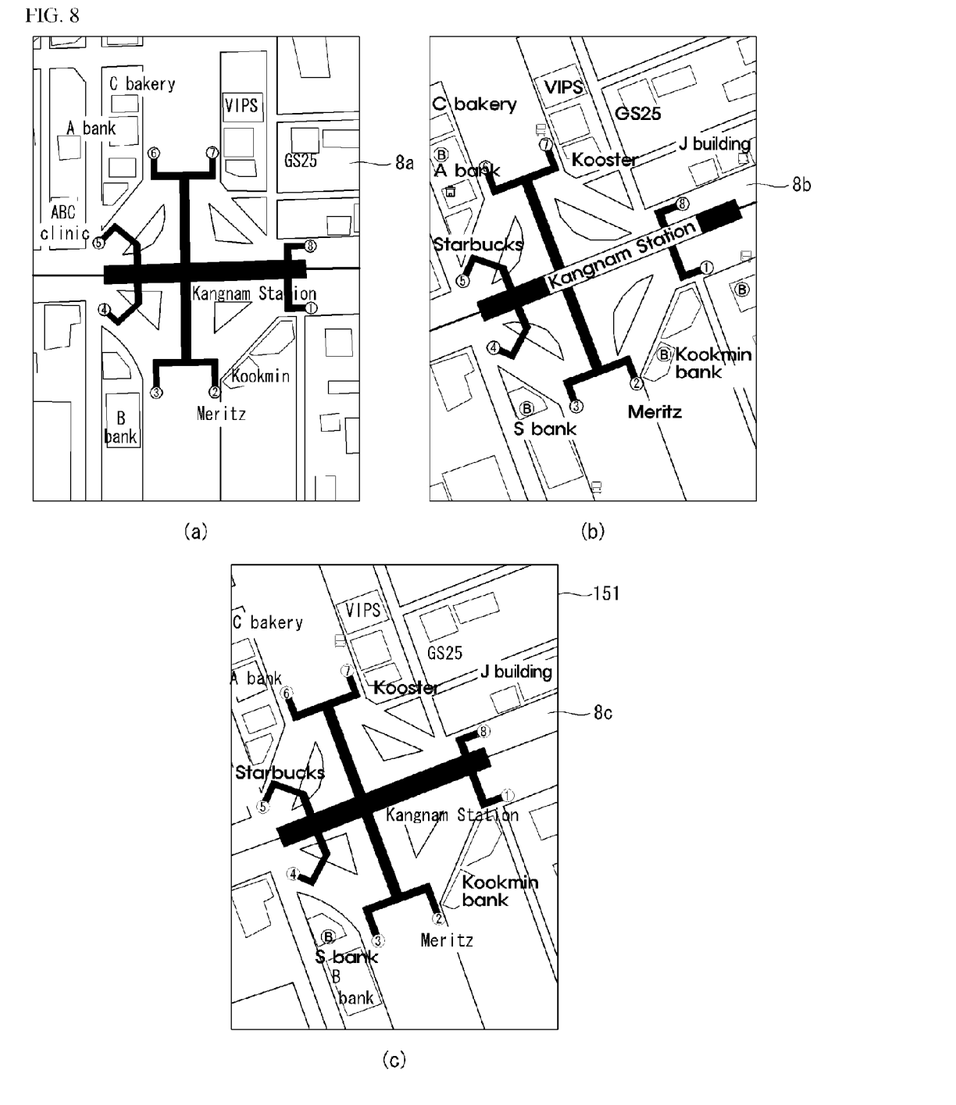
FIG. 8 shows still another example in which two map images are merged into a single image in an electronic device 100 according to a first embodiment of the present invention.

FIG. 8 shows still another example in which two map images are merged into a single image by combining at least one object extracted from a second map image with a first map image.

FIG. 8(*a*) is a first map image 8*a* showing map contents and FIG. 8(*b*) is a second map image 8*b* obtained from an external image. FIG. 8(*c*) is a third map image 8*c* produced by combining objects extracted from the second map image 8*b* with the first map image 8*a*.

Referring to FIG. 8, the controller 180 extracts at least one object from the second map image 8*b*, and then identifies overlapping objects by comparing the extracted objects with the objects included in the first map image 8*a*. That is, based on position, shape, and text of each object extracted from the second map image 8*b*, it can be checked whether objects similar to extracted objects to a predetermined level or more are included in the first map image 8*a*.

For example, if two texts displayed in the same area of the first 8*a* and the second map image 8*b* have the same meaning, the controller 180 determines that the two texts are similar to each other. Similarity between the texts may be determined by analyzing similarity of words, character strings, and so on included in the each of the texts. A method to determine similarity between texts is well known in the art and a detailed description of the method will be omitted.

If it is determined that there are similar objects in the first and second map images 8a and 8b, the controller (180) excludes some object that is similar to objects included in the first map image from the displaying.

For example, the controller 180 extracts two texts "Kookmin" and "Kookmin Bank" corresponding to each other from the first 8a and the second map image 8b, and then displays only the text "Kookmin Bank" of the two extracted objects on the third map image 8c.

Meanwhile, in FIG. 8, the controller 180 changes orientation and scale of the first map image 8a to be matched to those of the second map image 8b and combines the changed first map image 8a with the objects extracted from the second map image 8b for display, thereby generating the third map image 8c. However, the present invention is not limited to the above. According to the present invention, the controller 180 may utilize the first map image 8a to generate the third map image 8c without changing orientation and scale of the first map image 8a.

Referring back to FIG. 2, in step S104, the controller 180 may obtain a destination in various ways. For example, the controller 180 may obtain a destination based on a touch point on the third map image.

Also, when guiding of a path to the destination is started, the controller 180 may control the orientation of the third map image displayed on the display area based on a moving direction of the user. The moving direction of the user may be obtained based on the position information obtained through the location information module 115 or the sensing unit 140.

As described above, if the orientation of the map image is changed according to the moving direction, the user may identify his or her moving direction intuitively.

Hereinafter, a method for controlling an electronic device 100 and operation of the electronic device 100 to perform the method according to a second embodiment of the present invention will be described in detail with reference to related drawings.

Figure 9:
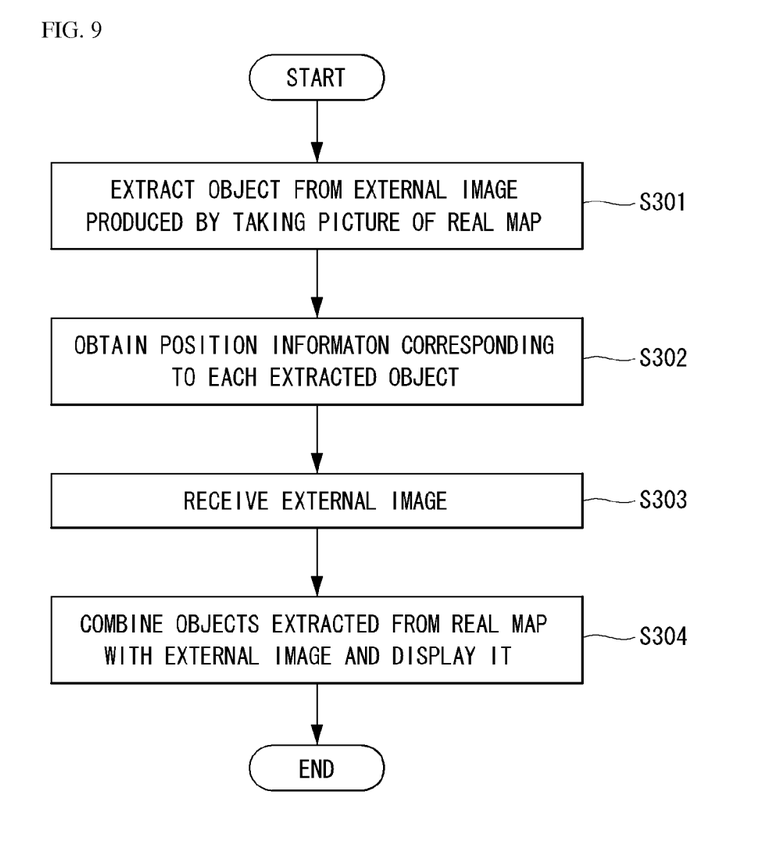
FIG. 9 is a flow chart illustrating a method for controlling an electronic device 100 according to a second embodiment of the present invention.
Figure 10:
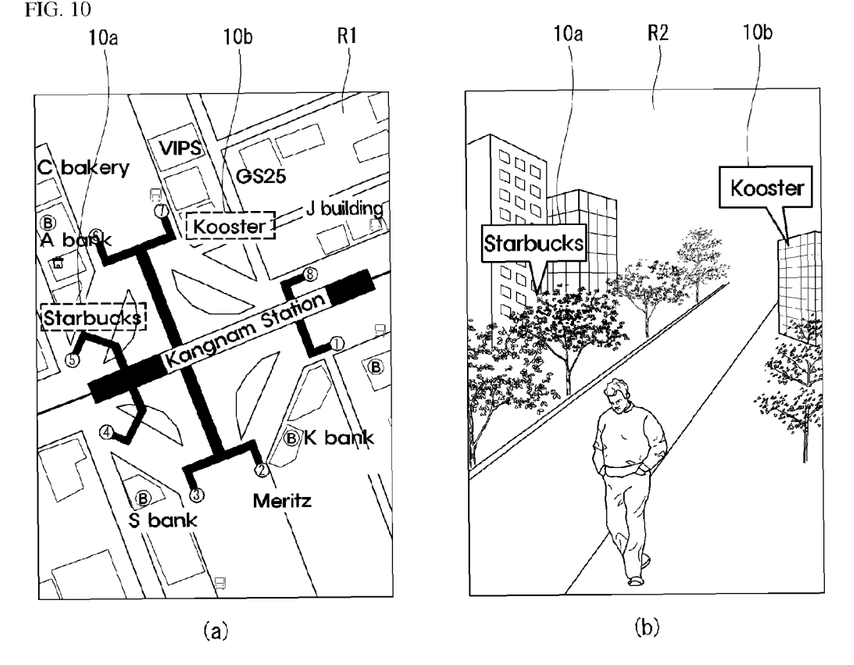
FIG. 10 shows one example in which objects extracted from an actual map image are combined with an external image and displayed in an electronic device 100 according to a second embodiment of the present invention.

FIG. 9 is a flow chart illustrating a method for controlling an electronic device 100 according to a second embodiment of the present invention. FIG. 10 shows a method for controlling an electronic device 100 according to a second embodiment of the present invention.

As shown in FIG. 9, the controller 180 receives an external image including a real map image through the camera 121, and then extracts at least one object from the real map image included in the external image S301. The extracted object may include texts, figures, icons, etc. for displaying various kinds of map information.

The controller 180 performs a process of mapping between the map image included in the external image and map data previously stored. And then, based on a mapping result, the controller 180 obtains position information corresponding to each object extracted from the map image included in the external image S302. Each extracted object is mapped to the corresponding position and stored in the memory 160.

Afterwards, while receiving an external image through the camera 160 S303, if a request for displaying objects extracted from the received external image at step 301 is received, the controller 180 retrieves corresponding objects from the memory 160 based on a current position of the electronic device 100 and a current viewing direction of the camera 121.

In other words, the controller 180 retrieves objects positioned along the viewing direction of the camera 121 from the memory 160 based on the current position of the electronic device 100. Also, the controller 180 combines the retrieved objects into the external image. If the retrieved object is a text, the controller 180 may translate the retrieved text into a language selected by the user and combine the translated text into the external image.

FIG. 10 illustrates one example of displaying objects extracted from a real map image by combining the objects with an external image.

FIG. 10(a) is a map image R1 obtained from an external image received through the camera 121 and FIG. 10(b) is an external image R2 in the form of a road view received from the camera 121.

Referring to FIG. 10, the controller 180, among objects extracted from the map image R1, combines objects 10a, 10b positioned along the viewing direction of the camera 121 with respect to a current position with the external image R2 in the form of a road view; and display the combined image.

According to the embodiments of the present invention described above, even if the user is traveling abroad or in a GPS-denied region, the electronic device 100 may provide the user with map information by using a real map. Also, if information displayed in the real map is more detailed than map contents, by combining the information obtained from the real map with the map contents, more detailed map information may be obtained. In addition, by translating texts obtained from a real map during an overseas trip into a language desired by the user and displaying the translated texts, user convenience is improved. Moreover, by changing the orientation of a map image displayed in a display area according to a moving direction of the user, the user may intuitively identify his or her moving direction within a map.

The above-described controlling method of the electronic device may be written as computer programs and may be implemented in digital microprocessors that execute the programs using a computer readable recording medium. The controlling method of the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage apparatus that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage apparatus s. The computer readable recording medium may also be distributed over network coupled computer systems so that the computer readable codes are stored and executed in a distributed manner.

While the present invention has been particularly shown and described with reference to exemplary embodiments thereof, it will be understood by those skilled in the art that various changes in the form and details may be made therein without departing from the spirit and scope of the present invention as defined by the following claims.

What is claimed is:

1. An electronic device, comprising:
a camera configured to capture images;
a display module configured to display images; and
a controller configured to:
   acquire a first map image having map content, the map content corresponding to a specific area;
   extract a second map image from an external image received via the camera, the external image including a real map photographed via the camera, the photographed real map corresponding to the specific area, and the second map image corresponding to the photographed real map;

synthesize the second map image and the first map image into a synthesized map image; and control the display module to display the synthesized map image.

2. The electronic device of claim 1, further comprising:
a radio communication unit configured to transmit information; and
a storage unit configured to store information,
wherein the first map image is acquired via the radio communication unit or via the storage unit.

3. The electronic device of claim 1, wherein synthesizing the second map image and the first map image comprises overlapping the first and second map images.

4. The electronic device of claim 3, wherein the controller is further configured to control orientation and scale of the first map image to coincide with orientation and scale of the second map image to at least a predetermined level.

5. The electronic device of claim 4, wherein the controller is further configured to map the first map image to the second map image based on a specific position such that the orientation and scale of the first map image coincides with the orientation and scale of the second map image.

6. The electronic device of claim 3, wherein synthesizing the second map image and the first map image further comprises changing transparency of at least the first map image or the second map image to a semi-transparent state.

7. The electronic device of claim 1, wherein:
the controller is further configured to extract at least one object from the second map image, and
synthesizing the second map image and the first map image comprises synthesizing an object of the extracted at least one object with the first map image.

8. The electronic device of claim 7, wherein the extracted at least one object includes text, a figure or an icon representing display map information.

9. The electronic device of claim 7, wherein the controller is further configured to exclude an object of the extracted at least one object that is similar to at least one object included in the first map image from being synthesized with the first map image.

10. The electronic device of claim 8, wherein when the extracted at least one object comprises text, the controller is configured to:
translate the text to a specified language; and
synthesize the translated text with the first map image.

11. An electronic device, comprising:
a camera configured to capture images; and
a controller configured to:
receive a first external image including a map image via the camera;
extract at least one object from the map image;
receive a second external image via the camera; and
display the extracted at least one object on the second external image via the display module,
wherein the controller displays the extracted at least one object on the second external image based on a position of each of the extracted at least one object, a current position of the electronic device and a viewing direction of the camera.

12. The electronic device of claim 11, wherein the extracted at least one object includes text, a figure or an icon representing display map information.

13. The electronic device of claim 12, wherein the controller is further configured to obtain the position of each of the extracted at least one object by mapping the map image included in the first external image to map contents corresponding to the current position of the electronic device.

14. The electronic device of claim 13, wherein the extracted at least one object displayed on the second external image is an object located along the viewing direction of the camera based on the current position of the electronic device.

15. A method for controlling an electronic device, the method comprising:
displaying map content corresponding to a specific area;
receiving an external image via a camera of the electronic device, the external image including a real map photographed via the camera, the photographed real map corresponding to the specific area;
extracting a map image from the external image, the map image corresponding to the photographed real man; and
synthesizing the map image and the map content by combining the map content and the map image.

* * * * *